United States Patent
Cator et al.

[15] 3,647,125
[45] Mar. 7, 1972

[54] INTERMITTENT FILM-FEEDING MECHANISM

[72] Inventors: Edward J. Cator, Naples; William A. Martin, Fairport, both of N.Y.

[73] Assignee: Eastman Kodak Company, Rochester, N.Y.

[22] Filed: Sept. 17, 1970

[21] Appl. No.: 72,957

[52] U.S. Cl. .............................................. 226/62, 352/194
[51] Int. Cl. ........................................................ G03b 1/22
[58] Field of Search ...................................... 226/62, 70–73; 352/194, 196, 195

[56] References Cited

UNITED STATES PATENTS 3,395,842   8/1968   Heinen ..................................... 226/62
3,572,567   3/1971   Claar .................................. 352/194 X Primary Examiner—Richard A. Schacher
Attorney—Robert W. Hampton and Raymond L. Owens

[57] ABSTRACT

An intermittent film-advancing mechanism is disclosed which comprises a claw member extending along the direction of film movement and having at one end a projection for engaging and disengaging film perforations and at the opposite end a cam follower portion adapted to be engaged by a "Lumiere-type" cam which drives the follower to provide the requisite up-down projection movement. A ramp-type cam slidably engages the claw intermediate its ends and is adapted to reciprocate (in-out) the projection in appropriate portions of an operating cycle in response to up-down movement of the claw. Resilient means coupled to the claw member are provided to constantly urge protrusions formed on the claw member into slidable engagement with a support wall whereby the claw member will pivot about the protrusions when the ramp causes in-out projection movement. Advantageously, this arrangement prevents the claw member from executing arcuate movement.

3 Claims, 3 Drawing Figures

PATENTED MAR 7 1972

EDWARD J. CATOR
WILLIAM A. MARTIN
INVENTORS

BY Raymond L. Owen
Robert W. Hampton

ATTORNEYS 3,647,125

INTERMITTENT FILM-FEEDING MECHANISM

CROSS-REFERENCES TO RELATED APPLICATIONS

Reference is made to commonly assigned copending U.S. Pat. application Ser. No. 69,807, entitled "Intermittent Film-Feeding Mechanism" filed Sept. 4, 1970 in the name of William A. Martin.

BACKGROUND OF THE INVENTION

The present invention relates to intermittent film-advancing devices, such as used in motion picture camera or projector apparatus.

A common form of intermittent film-advancing apparatus comprises a reciprocally mounted claw member which is adapted to engage a film perforation at the top of its downward stroke, move the next film frame into place, release the film perforation at the bottom of this stroke, and execute an upward stroke and again engage a subsequent perforation in preparation for the next downward stroke. It is a common practice in claw pulldown mechanism to position the claw arm at one end and to one side of the film gate so that during the pulldown stroke, the claw traverses an arcuate path. There are a number of disadvantages associated with this arcuate movement, such as for example undue film wear, noisiness, and difficulties in maintaining a high degree of accuracy in finding small perforations on the film.

SUMMARY OF THE INVENTION

In accordance with a preferred embodiment of the present invention, there is provided a claw member having an elongated projection at one end, which extends into a rectangular slot formed in the film guide wall, and a cam follower portion at the opposite end. A cam, preferably of the Lumiere-type, is coupled to the follower portion and imparts movement to the claw such that any fixed point on the cam follower portion will subscribe the general outline of a parallelogram while the projection executes up-down movement. A ramp-type cam is provided to slidably engage the claw intermediate between its projection and the cam follower portions for imparting in-out projection movement in response to the cam imparted movement of the claw member. An important feature of the invention is the provision of protrusions on the cam follower portion which are urged into a sliding engagement with the wall so that when the ramp causes the claw projection to execute in-out movement the claw will actually pivot about these protrusions.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawing, in which.

DESCRIPTION OF THE PREFERRED EMBODIMENT

Because photographic apparatus are well known, the present description will be directed in particular to elements forming part of, or cooperating more directly with, apparatus in accordance with the present invention, apparatus not specifically shown or described herein being selectable from those known in the art.

Figure 1:
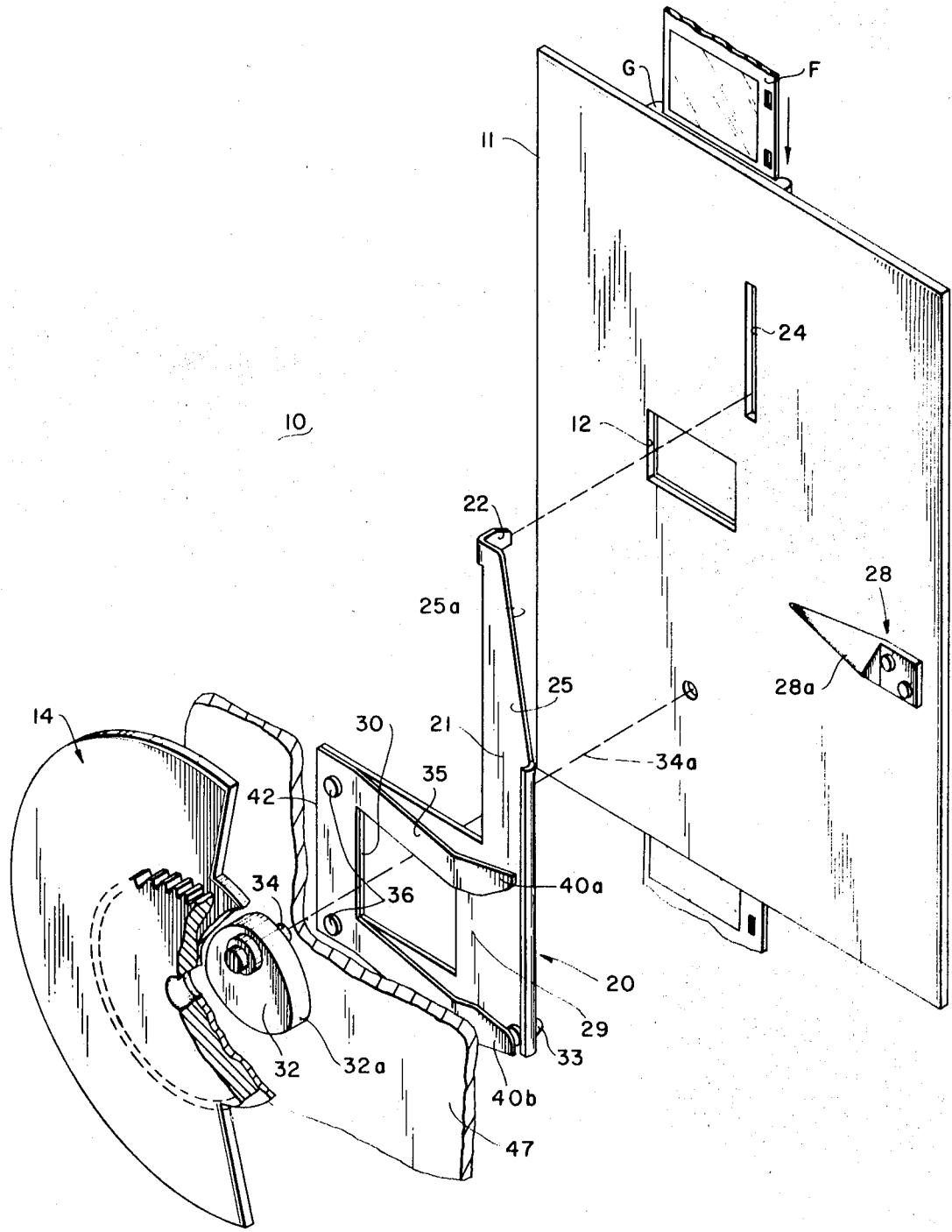
FIG. 1 is an exploded perspective view of an apparatus incorporating an exemplary film pulldown mechanism in accordance with a preferred embodiment of the present invention.
Figure 2:
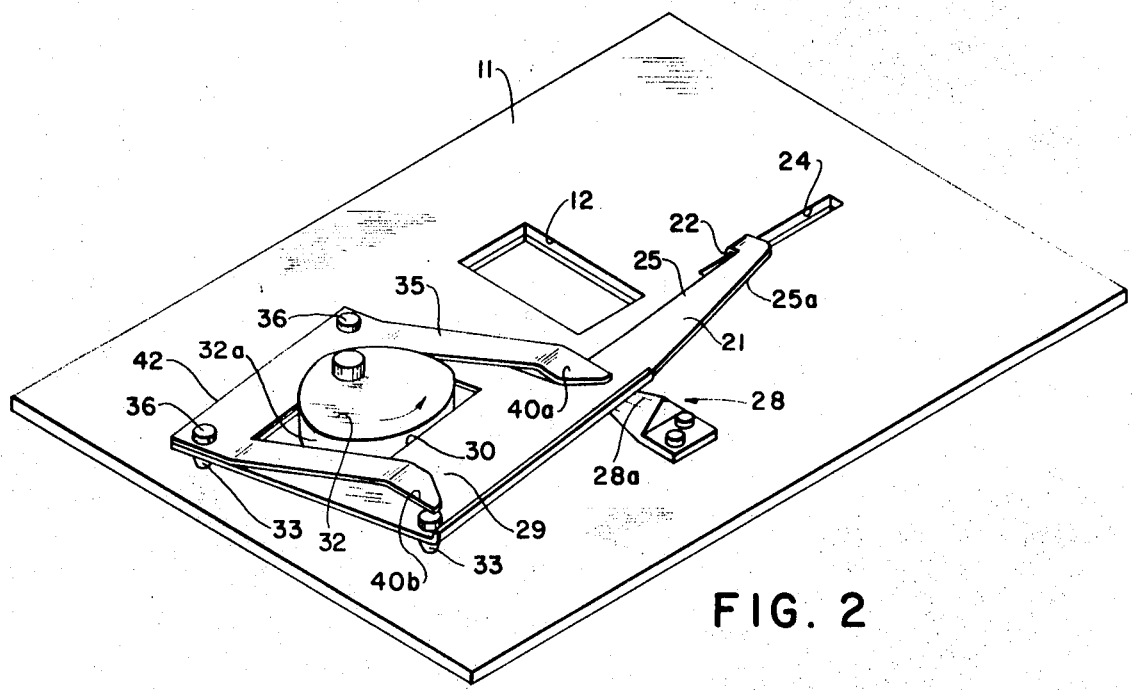
FIG. 2 is an assembled perspective view of the pulldown mechanism of FIG. 1.

Referring now to FIGS. 1 and 2, there is shown a photographic apparatus 10 comprising a film gate G having a wall 11 defining a film guide surface and provided with a projection aperture or opening 12 past which the film F is adapted to be intermittently moved along a rectilinear path. In the embodiment shown, this is a vertically downward direction. The film F is moved stepwise past the opening 12 and is supported in the film gate G which is adapted to maintain the proper alignment of the film as each frame moves past the projection aperture 12. The film gate G may be of a conventional design having a pressure plate and side guides that is so well understood in the art that it need not be illustrated here. The opening 12 is in alignment with a suitable shutter mechanism 14 and an appropriate illuminating system, not shown. The wall 11 and the gate G constitutes a mounting means for permitting the film F to be moved in a rectilinear fashion.

The film F is adapted to be fed stepwise through the gate by a film-feeding mechanism 20 which includes a rigid elongated claw member 21 disposed so as to be aligned generally along the path of travel of the film F as will be explained more fully hereinafter. Sufficit it to say here, this alignment aids in preventing the claw 21 from executing unwanted arcuate movement. At its free end the claw 21 has a projection 22 which is adapted to be received by a slot 24 formed in the wall 11. The projection 22 is adapted to undergo the conventional "up-down" and "in-out" movement for advancing the film F. The sides of the slot 24 are rectangular in shape and the slot is just slightly wider than the thickness of the projection 22 so that the projection 22 will not bind in the slot 24 when the other end of the claw is driven in a rectangular path by operation of mechanism 20. The slot 24 has been located so that it extends in the direction of the film path substantially in alignment with the row of perforations on the film F.

The claw member 21 extends from its free end formed with the projection 22 along an intermediate portion 25 which has a flat surface 25a adapted to cooperate with a ramp cam 28 fixedly secured to the wall 11. The ramp cam 28 has an inclined surface away from wall 11, i.e., tapering outwardly from left to right as viewed in the drawings. Surface 28a cooperates with the intermediate portion 25 in the manner which will be described hereinafter. The intermediate portion 25 of the claw member 21 merges into a cam engaging or follower portion 29 which is formed with a rectangular opening 30 which receives an "up-down" cam 32. The opening 30 is sized so as to slidably engage the periphery 32a of the cam 32 to permit the up-down movement of the claw projection 22 as will become more apparent later.

Preferably, the cam 32 is generally heart shaped (viz of a Lumiere-type) and is driven in a conventional manner by a motor not shown but which also drives the shutter mechanism 14. The cam 32 is eccentrically mounted in relation to the axis 34a of the drive shaft 34 which is disposed to be perpendicular to the path of advance of the film and if extended would intersect the center line of the film strip F. Because of this location and the position of the projection 22, the claw member 21 extends in the (viz parallel to the film centerline) direction of film advance.

Since the free end (viz the projection portion) of the claw member 21 is constrained to execute a reciprocal, rectilinear motion, and the claw 21 is constrained to movement with a single degree of freedom (the in-out film-engaging movement being neglected for our purpose here), the Lumiere cam will cause any fixed point on the cam follower portion 29 to subscribe a pattern, the outline of which takes the shape of a parallelogram.

The follower portion of the claw 21 is provided with two spaced, hemispherically shaped protrusions 33 disposed near opposite ends of one lateral edge of the follower portion 29. The two protrusions 33 actually act as pivots for the claw member 21 during the in-out movement of the projection 22. When the intermediate portion 25 of the claw member 21 is as far up the incline 28a as it can travel, the projection 22 will be withdrawn from its corresponding perforation (remembering that the protrusions 33 are in constant engagement with the wall 11 and the cam follower portion 29 of the member 21 can slide along the surface 32a of the cam 32). Conversely, when the intermediate portion 25 is at its bottommost position in the incline 28a, the projection 22 will be received by its corresponding perforation in the film F.

A spring member 35 urges the protrusions 33 into a constant sliding engaging relationship with the wall 11. The member 35 is bifurcated leaf spring secured at one end by rivets 36, near one edge 42 of the cam portion 29, and is so disposed that its two blades 40a and 40b at the other end resiliently bear against a supported wall 47 and the pulldown mechanism. A spring force is thus developed and is selected to be of such a level so as normally to keep the protrusions 33 slidably engaged with the wall 11 and to keep surface 25a of the claw member 21 in positive slidable engaging relation with the ramp incline 28a of the ramp member 28. However, if the projection 22 engages the film (rather than entering a perforation) as it moves towards the film F due to misalignment of a perforation, such engagement between the film and the claw will allow the claw to lift off the ramp surface 28a against the bias of spring 35 until the projection 22 enters a film perforation. Thereafter a pulldown sequence will proceed normally.

Figure 3:
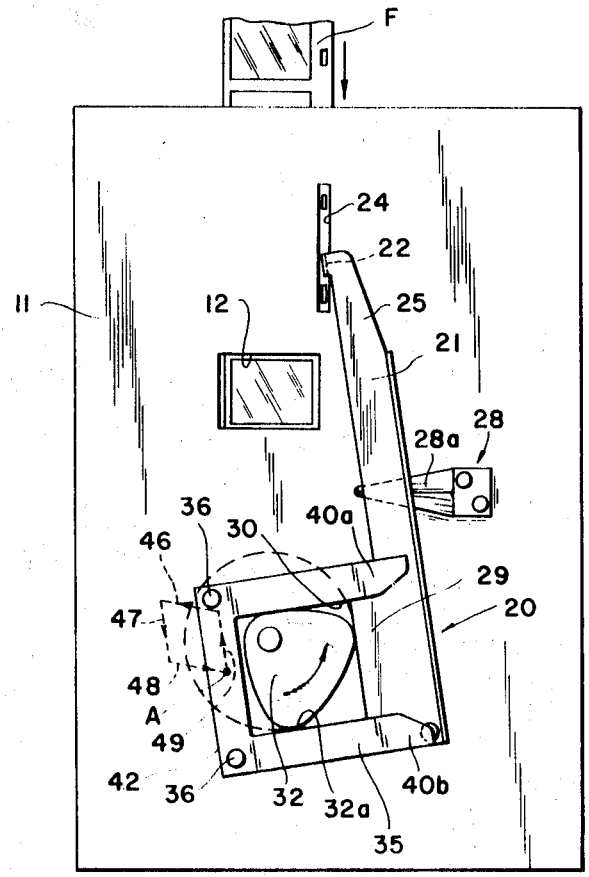
FIG. 3 is an elevational view of the mechanism of FIG. 2.

Referring to FIG. 3, at that point in the operation just prior to when the pulldown stroke is initiated, the surface 25a of the intermediate portion 25 of the claw will be driven as far up on the cam incline surface 28a as it can and projection 22 is disengaged from the film. Thereafter as operation commences, the intermediate surface 25a will be moved down from this high point position by operation of cam 32 so that surface 25a just barely engages the left end of surface 28a. Considering any arbitrary fixed point ("A") on the cam follower portion 29, it will substantially subscribe a parallelogram (shown in FIG. 3 in dotted lines).

Assuming that we start with the illustrative position of Point A. Point A will subscribe an edge 49 as the up-down cam 32 drives the projection 22 upwardly. Thereafter, ramp 28 will cause the projection 22 to enter into a perforation in response to the cam 32 causing Point A to subscribe edge 46. The up-down cam 32 will now drive the projection 22 downwardly until a new film frame has been positioned. At this time edge 47 will be completed. Thereafter the cam 32 causes the intermediate portion 25 of the claw member to move up the ramp surface 28 thereby disengaging the projection from the perforation as Point A subscribes line 48 which is parallel to line 46 and takes us back to the original starting point. The parallelogram subscribed by any other point on the follower portion 29 will be disposed in a different location but have substantially the same dimensions as the illustrative parallelogram.

The invention has been described in detail with particular reference to the preferred embodiment thereof, but it will be understood that variations and modifications can be effected within the spirit and scope of the invention.

We claim:

1. In apparatus for intermittently advancing a filmstrip having a row of spaced perforations along a predetermined film path past an aperture, the combination comprising:
   a. guide means defining a surface for guiding the film strip, said guide means being provided with a rectilinear slot opening onto said surface and extending in a direction of the predetermined path substantially in alignment with the row of perforations in the film strip;
   b. a movable, elongated member positioned adjacent said guide means and extending in the direction of the predetermined path and including:
      1. a film-engaging projection extending into said slot and being guided for movement within the slot in response to movement of said elongated member;
      2. a follower portion having pivoting means disposed thereon and adapted to slidably engage said guide means and about which said elongated member is adapted to pivot; and
      3. an intermediate portion disposed between said projection and said follower portion;
   c. cam means coupled to said follower portion for moving said elongated member in a manner so that any selected point on said follower portion will substantially subscribe the outline of a parallelogram and said film engaging projection will execute up-down movement in said slot;
   d. ramp means slidably engaging said intermediate portion in response to movement of said elongate member to move said projection into and out of film engagement as said elongated member pivots about said pivoting means; and
   e. resilient means engaging said elongated member for urging said pivoting means into a sliding engagement with said guide means and said intermediate portion into sliding engagement with said ramp means.

2. The invention as set forth in claim 1 wherein said camming means includes a Lumiere-type cam and said cam portion is provided with an opening for slidably receiving said Lumiere-type cam.

3. The invention as set forth in claim 2 including a second support wall and wherein said resilient means comprises a bifurcated spring member coupled to said follower portion and having two blades adapted to bear against said second wall.

* * * * *